United States Patent
Shenoy et al.

(10) Patent No.: US 10,536,053 B2
(45) Date of Patent: *Jan. 14, 2020

(54) HIGH SPEED MOTOR DRIVE

(71) Applicant: Upwing Energy, LLC, Cerritos, CA (US)

(72) Inventors: Suratkal P. Shenoy, Mission Viejo, CA (US); Liping Zheng, Buena Park, CA (US); Herman Artinian, Huntington Beach, CA (US); Patrick McMullen, Villa Park, CA (US); David Biddick, Houston, TX (US); Kuo-Chiang Chen, Kennedale, TX (US)

(73) Assignee: Upwing Energy, LLC, Cerritos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,545

(22) Filed: Dec. 28, 2017

(65) Prior Publication Data

US 2019/0089290 A1    Mar. 21, 2019

Related U.S. Application Data

(60) Provisional application No. 62/561,067, filed on Sep. 20, 2017.

(51) Int. Cl.
*E21B 43/12* (2006.01)
*H02K 7/09* (2006.01)
(Continued)

(52) U.S. Cl.
CPC .............. *H02K 7/09* (2013.01); *E21B 4/003* (2013.01); *E21B 4/02* (2013.01); *E21B 4/04* (2013.01); *E21B 17/028* (2013.01); *E21B 41/0085* (2013.01); *E21B 43/121* (2013.01); *E21B 43/128* (2013.01); *E21B 47/0007* (2013.01); *E21B 47/01* (2013.01); *E21B 47/06* (2013.01); *E21B 47/09* (2013.01); *E21B 47/12* (2013.01); *F04B 17/03* (2013.01); *F04B 47/04* (2013.01);
(Continued)

(58) Field of Classification Search
CPC ..................................................... E21B 43/128
See application file for complete search history.

(56) References Cited

U.S. PATENT DOCUMENTS

| | | | |
|---|---|---|---|
| 5,923,111 A * | 7/1999 | Eno ..................... | E21B 43/128 310/153 |
| 7,971,650 B2 * | 7/2011 | Yuratich ............... | E21B 43/128 166/105 |

(Continued)

FOREIGN PATENT DOCUMENTS

GB         2501352 B    11/2017

*Primary Examiner* — Giovanna C Wright
(74) *Attorney, Agent, or Firm* — Fish & Richardson P.C.

(57) ABSTRACT

A system to provide power to a downhole-type tool includes a downhole-type electric motor that can be positioned in a wellbore and a variable speed drive electrically connected to the electric motor, in which the downhole-type electric motor can operate at rotary speeds of at least 6,000 rotations per minute (rpm), the variable speed drive can control and supply power to the electric motor when the electric motor is positioned at a downhole location inside the wellbore, and the variable speed drive can be at a surface of the wellbore.

21 Claims, 5 Drawing Sheets

(51) Int. Cl.

| | | |
|---|---|---|
| *E21B 17/02* | (2006.01) | |
| *E21B 41/00* | (2006.01) | |
| *F04D 13/08* | (2006.01) | |
| *E21B 4/02* | (2006.01) | |
| *H02K 5/132* | (2006.01) | |
| *E21B 4/04* | (2006.01) | |
| *F04D 13/06* | (2006.01) | |
| *F04D 13/10* | (2006.01) | |
| *E21B 47/01* | (2012.01) | |
| *E21B 47/06* | (2012.01) | |
| *E21B 47/09* | (2012.01) | |
| *E21B 47/12* | (2012.01) | |
| *F04D 29/041* | (2006.01) | |
| *F04D 29/048* | (2006.01) | |
| *F16C 32/04* | (2006.01) | |
| *F16C 37/00* | (2006.01) | |
| *E21B 47/00* | (2012.01) | |
| *F04B 17/03* | (2006.01) | |
| *F04B 47/04* | (2006.01) | |
| *H02K 1/27* | (2006.01) | |
| *H02K 7/18* | (2006.01) | |
| *H02K 11/21* | (2016.01) | |
| *H02K 11/27* | (2016.01) | |
| *H02K 11/30* | (2016.01) | |
| *F04D 29/051* | (2006.01) | |
| *H02H 7/00* | (2006.01) | |
| *H02K 7/14* | (2006.01) | |
| *H02P 29/40* | (2016.01) | |
| *H02K 3/42* | (2006.01) | |
| *H02K 21/14* | (2006.01) | |
| *E21B 4/00* | (2006.01) | |
| *F04D 13/02* | (2006.01) | |
| *F16F 15/03* | (2006.01) | |
| *H02K 15/03* | (2006.01) | |
| *E21B 33/12* | (2006.01) | |
| *H02K 5/128* | (2006.01) | |
| *E21B 43/16* | (2006.01) | |

(52) U.S. Cl.
CPC ......... *F04D 13/026* (2013.01); *F04D 13/064* (2013.01); *F04D 13/0633* (2013.01); *F04D 13/08* (2013.01); *F04D 13/086* (2013.01); *F04D 13/10* (2013.01); *F04D 29/041* (2013.01); *F04D 29/048* (2013.01); *F04D 29/051* (2013.01); *F16C 32/044* (2013.01); *F16C 32/0474* (2013.01); *F16C 32/0476* (2013.01); *F16C 37/005* (2013.01); *H02H 7/005* (2013.01); *H02K 1/2793* (2013.01); *H02K 3/42* (2013.01); *H02K 5/132* (2013.01); *H02K 7/14* (2013.01); *H02K 7/1807* (2013.01); *H02K 11/21* (2016.01); *H02K 11/27* (2016.01); *H02K 11/30* (2016.01); *H02K 21/14* (2013.01); *H02P 29/40* (2016.02); *E21B 33/12* (2013.01); *E21B 43/168* (2013.01); *E21B 47/065* (2013.01); *F16C 2380/26* (2013.01); *F16F 15/03* (2013.01); *H02K 5/128* (2013.01); *H02K 15/03* (2013.01); *H02K 2205/03* (2013.01)

(56) References Cited

U.S. PATENT DOCUMENTS

| | | | |
|---|---|---|---|
| 10,145,224 B1 * | 12/2018 | Shenoy | E21B 4/04 |
| 2003/0132003 A1 * | 7/2003 | Arauz | E21B 43/128 |
| | | | 166/370 |
| 2012/0017634 A1 * | 1/2012 | Dorman | F04C 18/16 |
| | | | 62/498 |
| 2015/0114632 A1 | 4/2015 | Romer et al. | |
| 2016/0118919 A1 * | 4/2016 | Malone | H02P 8/38 |
| | | | 318/400.42 |
| 2017/0045055 A1 * | 2/2017 | Hoefel | F04D 1/06 |
| 2017/0138159 A1 * | 5/2017 | Hoyte | F04D 19/00 |

* cited by examiner

HIGH SPEED MOTOR DRIVE

CROSS-REFERENCE TO RELATED APPLICATIONS

This application claims the benefit under 35 U.S.C. § 119(e) of U.S. patent application Ser. No. 62/561,067, entitled "Sealless Downhole System with Magnetically Supported Rotor," filed Sep. 20, 2017, which is incorporated herein by reference in its entirety.

TECHNICAL FIELD

This application relates to electric machines, such as high speed motors.

BACKGROUND

In downhole applications, motors are employed downhole for various processes, such as pumping, compressing, or blowing of well fluids to enhance fluid recovery and process flow. Downhole devices rotate at speeds that are determined by the process fluid and method of enhancement to the fluid flow. Downhole devices are typically driven from a surface location and therefore often require power to be transmitted over long distances, for example, over 100 meters to the downhole device located within a wellbore formed in a subterranean zone.

SUMMARY

This disclosure describes technologies relating to providing power to downhole-type motor.

An example implementation of the subject matter described within this disclosure is a system to provide power to a downhole-type tool with the following features. The system includes a downhole-type electric motor that can be positioned in a wellbore and a variable speed drive electrically connected to the electric motor, in which the downhole-type electric motor can operate at rotary speeds of at least 6,000 rotations per minute (rpm), the variable speed drive can control and supply power to the electric motor when the electric motor is positioned at a downhole location inside the wellbore, and the variable speed drive can be at a surface of the wellbore.

Aspects of the example implementation, which can be combined with the example implementation alone or in combination, include the following.

A distance between the surface and the downhole location can be at least 100 meters.

The distance between the surface and the downhole location can be at least 500 meters.

The variable speed drive can be sensorless.

The variable speed drive can generate and transmit a drive signal to supply power to the electric motor, and the drive signal can be sufficient to power the electric motor to operate at the rotary speeds.

The drive signal can include a pulse width modulated sinusoidal waveform, and the variable speed drive can switch frequencies at a rate that is sufficient to generate the drive signal to power the electric motor to operate at the rotary speeds.

The electric motor can include an electric rotor, an electric stator surrounding the electric rotor, a coupling attached to an end of the electric rotor, and a containment sleeve surrounding the electric rotor and the magnetic coupling, in which the magnetic coupling can transmit rotational force to a separate rotational device, and the containment sleeve can maintain the electric rotor and the magnetic coupling in compression during rotation of the electric rotor at the rotary speeds.

The containment sleeve can support a centrifugal loading of the magnetic coupling.

The electric rotor can include a permanent magnet, and the containment sleeve can maintain the permanent magnet in compression during rotation of the electric rotor at the rotary speeds.

The containment sleeve can be made of a high tensile strength material including at least one of metal or carbon-fiber.

The containment sleeve can be made of metal, and the metallic containment sleeve can form a portion of a stiffness path of the electric rotor.

The electric stator can be constructed with laminations having a thickness sufficient to decrease eddy current losses due to a frequency of a drive signal generated and transmitted by the variable speed drive to supply power to the electric motor to operate at the rotary speeds.

The motor can be a permanent magnet synchronous motor.

A distance between an outer diameter of the containment sleeve and an inner diameter of the electric stator can be substantially 0.025 inches or larger.

Another example implementation of the subject matter described within this disclosure is a system to provide power to a tool. The system includes an electric motor that can operate at rotary speeds of at least 6,000 rpm and a variable speed drive electrically connected to the electric motor, in which the variable speed drive can control and supply power to the electric motor when the electric motor is spaced apart from the variable speed drive by a distance of at least 100 m.

Aspects of the example implementation, which can be combined with the example implementation alone or in combination, include the following.

The variable speed drive can generate and transmit a drive signal to supply power to the electric motor, and the drive signal can be sufficient to power the electric motor to operate at the rotary speeds.

The drive signal can include a pulse width modulated sinusoidal waveform, and the variable speed drive can switch frequencies at a rate that is sufficient to generate the drive signal to power the electric motor to operate at the rotary speeds.

The electric motor can include an electric rotor, an electric stator surrounding the electric rotor, a magnetic coupling attached to an end of the electric rotor, and a containment sleeve surrounding the electric rotor and the magnetic coupling, in which the magnetic coupling can transmit rotational force to a separate rotational device, and the containment sleeve can maintain the magnetic coupling in compression during rotation of the electric rotor at the rotary speeds.

The containment sleeve can support a centrifugal loading of the magnetic coupling.

The containment sleeve can be made of a high tensile strength material including at least one of metal or carbon-fiber.

The containment sleeve can be made of metal, and the metallic containment sleeve can form a portion of a stiffness path of the electric rotor.

The electric stator can be constructed with laminations having a thickness sufficient to decrease eddy current losses due to a frequency of a drive signal generated and transmitted by the variable speed drive to supply power to the electric motor to operate at the rotary speeds.

The electric motor can be a permanent magnet synchronous motor.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

Figure 1:
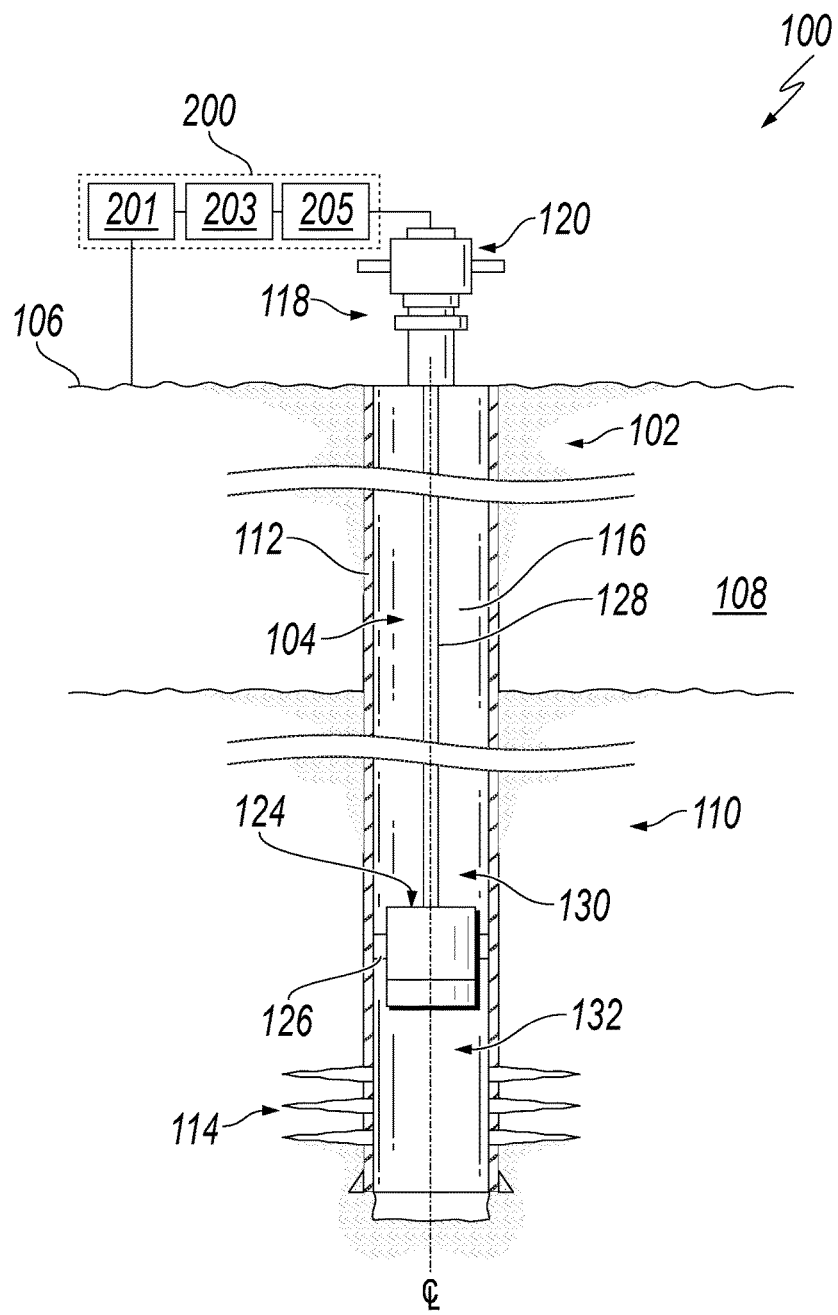
FIG. 1 is a schematic side view of an example well system.

In the downhole environment, it is difficult to install and operate any equipment due to the caustic fluids present, pressures, temperatures, and relative distance from any supporting equipment that cannot be repackaged to fit in a small diameter tube. In addition, any installation and removal of tools in the well requires the well to be "shutdown" or "killed" to prevent fluid flowing to the surface that can cause damage or injury, a very costly process not only in performing the work but also in lost production and risk in damaging the well where further production is jeopardized.

While all these issues and risk exist, the potential benefit of well intervention with production enhancing tools and measurement equipment outweighs the risk because of the enhanced production it can offer. In downhole applications, downhole motors are needed to allow for downhole pumping, compressing, or blowing of well fluids to enhance fluid recovery and process flow. Downhole devices rotate at speeds that are determined by the process fluid and method of enhancement to the fluid flow and can range from 3,000 rotations per minute (rpm) to 60,000 rpm. Current downhole equipment typically do not operate at high speeds; typical downhole equipment operate below 6,000 rpm and usually below 3,600 rpm.

Motor design is one factor that limits operating speeds. Another factor is whether the motor is operated or driven by a variable speed drive. Variable speed drive (VSD) describes equipment used to control the speed and rotational force (or torque output) of machinery, such as an electric motor. If the output speed of a drive can be changed without steps over a range, the drive is referred to as variable speed. In contrast, some motors are fixed speed (operating at one speed) or two-speed and are controlled by switching on or off. In processes, demand of flow (for example, from a pump) can fluctuate, and varying the speed of the drive can allow the operator to compensate for changes in process variable and can also save energy.

Another factor that affects operating speeds of downhole devices is bearings, specifically, the type of bearings used and how they are protected from the environment. An example of a typical bearing used in downhole equipment is the fluid film bearing. Fluid film bearings need clean lubrication to operate reliably. Maintaining clean lubrication for fluid film bearings is typically accomplished by flooding the motor and bearing assembly with a barrier fluid (for example, within a protected motor section) and using a seal to mitigate process fluid ingress and contamination. While such flooding allows for operation of the system, flooding can cause increased windage (an undesirable force created by friction) and pumping loads of the fluid by the rotor, both of which can reduce overall efficiency as well as limit the ability of the equipment to operate at faster speeds. Reliability and long operating life of process equipment are key parameters in determining success and profitability of a producing well. Well intervention to remove, repair, and re-install downhole devices can be very costly and, in some cases, be more expensive than the cost of the device itself.

While these benefits have been demonstrated, reliability and robustness of equipment in this harsh environment is not close to conventional topside mounted equipment. The described technology can be implemented as a high speed motor drive, and a non-contact bearing system that does not rely on barrier fluid for operation can be utilized. This high speed system can be standalone in that it can be used to drive multiple, different devices, independent of the process fluid, as the system is isolated from the downhole environment. The drive system includes a high speed motor (which can include a permanent magnet), magnetic bearings (radial and thrust), and a topside VSD to control motor speed and torque. The system can include a magnetic bearing controller that is fully topside (that is, located at the surface), fully downhole (that is, can be employed downhole, for example, within a wellbore), or have parts topside and parts downhole. The drive system components are isolated from the environment, and the drive system is capable of operating at high speeds (for example, 60,000 rpm). Utilizing a high speed drive system can allow for increased options in designing downhole equipment, without speed restrictions which are typically imposed on downhole equipment.

FIG. 1 depicts an example well system 100 constructed in accordance with the concepts herein. The well system 100 includes a well 102 having a wellbore 104 that extends from the surface 106 through the Earth 108 to one more subterranean zones of interest 110 (one shown). The well system 100 enables access to the subterranean zones of interest 110 to allow recovery, i.e., production, of fluids to the surface 106 and, in certain instances, additionally or alternatively allows fluids to be placed in the earth 108. In certain instances, the subterranean zone 110 is a formation within the Earth 108 defining a reservoir, but in other instances, the zone 110 can be multiple formations or a portion of a formation. For simplicity's sake, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a gas well that is used in producing natural gas from the subterranean zones of interest 110 to the surface 106. While termed a "gas well," the well need not produce only dry gas, and may incidentally or in much smaller quantities, produce liquid including oil and/or water. In certain instances, the production from the well 102 can be multiphase in any ratio, and/or despite being a gas well, the well can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells or even production wells, and could be used in wells for producing liquid resources such as oil, water or other liquid resource, and/or could be used in injection wells, disposal wells or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threadedly and/or otherwise) end-to-end. In FIG. 1, the casing 112 is perforated (i.e., having perforations 114) in the subterranean zone of interest 110 to allow fluid communication between the subterranean zone of interest 110 and the bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached the wellhead 118. The Christmas tree 120 includes valves used to regulate flow into or out of the well 102.

The well system 100 also includes a downhole-type system 124 residing in the wellbore 104, for example, at a depth that is nearer to subterranean zone 110 than the surface 106. The downhole-type system 124, being of a type configured in size and robust construction for installation within a well 102, can be any type of rotating equipment that can assist production of fluids to the surface 106 and out of the well 102 by creating an additional pressure differential within the well 102. For example, the downhole-type system 124 can be a pump, compressor, blower, or multi-phase fluid flow aid. In particular, casing 112 is commercially produced in a number of common sizes specified by the American Petroleum Institute (the "API), including 4½, 5, 5½, 6, 6⅝, 7, 7⅝, 16/8, 9⅝, 10¾, 11¾, 13⅜, 16, 116/8 and 20 inches, and the API specifies internal diameters for each casing size. The downhole-type system 124 can be configured to fit in, and (as discussed in more detail below) in certain instances, seal to the inner diameter of one of the specified API casing sizes. Of course, the downhole-type system 124 can be made to fit in and, in certain instances, seal to other sizes of casing or tubing or otherwise seal to the wall of the wellbore 104.

Additionally, as a downhole-type system 124, the construction of its components are configured to withstand the impacts, scraping, and other physical challenges the system 124 will encounter while being passed hundreds of feet/ meters or even multiple miles/kilometers into and out of the wellbore 104. For example, the downhole-type system 124 can be disposed in the wellbore 104 at a depth of up to 20,000 feet (6,096 meters). Beyond just a rugged exterior, this encompasses having certain portions of any electronics being ruggedized to be shock resistant and remain fluid tight during such physical challenges and during operation. Additionally, the downhole-type system 124 is configured to withstand and operate for extended periods of time (e.g., multiple weeks, months or years) at the pressures and temperatures experienced in the wellbore 104, which temperatures can exceed 400° F./205° C. and pressures over 2,000 pounds per square inch, and while submerged in the well fluids (gas, water, or oil as examples). Finally, as a downhole-type system 124, the system 124 can be configured to interface with one or more of the common deployment systems, such as jointed tubing (i.e., lengths of tubing joined end-to-end, threadedly and/or otherwise), a sucker rod, coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (for example, a jointed tubing connector, coiled tubing connector, or wireline connector). In FIG. 1, the system 124 is shown deployed on wireline 128.

A seal system 126 integrated or provided separately with a downhole system, as shown with the downhole-type system 124, divides the well 102 into an uphole zone 130 above the seal system 126 and a downhole zone 132 below the seal system 126. FIG. 1 shows the downhole-type system 124 positioned in the open volume of the bore 116 of the casing 112, and not within or a part of another string of tubing in the well 102. The wall of the wellbore 104 includes the interior wall of the casing 112 in portions of the wellbore 104 having the casing 112, and includes the open hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open hole portions of the wellbore 104. In certain instances, the seal system 126 can form a gas and liquid tight seal at the pressure differential the system 124 creates in the well 102. In some instances, the seal system 126 of the downhole-type system 124 seals against the interior wall of the casing 112 or the open hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type system 124 from a pressure in the wellbore 104 uphole of the seal system 126 of the downhole-type system 124. Although FIG. 1 includes both the downhole-type system 124, in other instances, additional components, such as a surface compressor, can be used in conjunction with the system 124 to boost pressure in the well 102.

In some implementations, the downhole-type system 124 can be implemented to alter characteristics of a wellbore by a mechanical intervention at the source. Alternatively, or in addition to any of the other implementations described in this specification, the downhole-type system 124 can be implemented as a high flow, low pressure rotary device for gas flow in sub-atmospheric wells. Alternatively, or in addition to any of the other implementations described in this specification, the downhole-type system 124 can be implemented in a direct well-casing deployment for production through the wellbore. Other implementations of the downhole-type system 124 as a pump, compressor, or multiphase combination of these can be utilized in the well bore to effect increased well production.

The downhole-type system 124 can be used to locally alter the pressure, temperature, and/or flow rate conditions of the fluid in the wellbore 104 proximate the system 124 (e.g., at the base of the wellbore 104). In certain instances, the alteration performed by the system 124 can optimize or help in optimizing fluid flow through the wellbore 104. As described above, the downhole-type system 124 creates a pressure differential within the well 102, for example, particularly within the wellbore 104 the system 124 resides in. In some instances, a pressure at the base of the wellbore 104 is a low pressure (e.g., sub-atmospheric); so unassisted fluid flow in the wellbore can be slow or stagnant. In these and other instances, the downhole-type system 124 introduced to the wellbore 104 adjacent the perforations 114 can reduce the pressure in the wellbore 104 near the perforations 114 to induce greater fluid flow from the subterranean zone 110, increase a temperature of the fluid entering the system 124 to reduce condensation from limiting production, and increase a pressure in the wellbore 104 uphole of the system 124 to increase fluid flow to the surface 106.

The downhole-type system 124 moves the fluid at a first pressure downhole of the system 124 to a second, higher pressure uphole of the system 124. The system 124 can operate at and maintain a pressure ratio across the system 124 between the second, higher uphole pressure and the first, downhole pressure in the wellbore. The pressure ratio of the second pressure to the first pressure can also vary, for example, based on an operating speed of the system 124.

The downhole-type system 124 can operate in a variety of downhole conditions of the wellbore 104. For example, the initial pressure within the wellbore 104 can vary based on the type of well, depth of the well 102, production flow from the perforations into the wellbore 104, and/or other factors. In some examples, the pressure in the wellbore 104 proximate a bottomhole location is sub-atmospheric, where the pressure in the wellbore 104 is at or below about 14.7 pounds per square inch absolute (psia), or about 101.3 kiloPascal (kPa). The system 124 can operate in sub-atmospheric wellbore pressures, for example, at wellbore pressure between 2 psia (13.8 kPa) and 14.7 psia (101.3 kPa). In some examples, the pressure in the wellbore 104 proximate a bottomhole location is much higher than atmospheric, where the pressure in the wellbore 104 is above about 14.7 pounds per square inch absolute (psia), or about 101.3 kiloPascal (kPa). The system 124 can operate in above atmospheric wellbore pressures, for example, at wellbore pressure between 14.7 psia (101.3 kPa) and 5,000 psia (34,474 kPa).

The well system 100 can include a magnetic bearing system for rotor support (a magnetic thrust bearing for thrust support and a magnetic radial bearing for radial support), a high speed permanent magnet motor for torque, a sensor-less long distance variable frequency drive, magnetic bearing controls, and advanced fluid compression and pump configuration can be used to improve reliability and robustness of downhole-type equipment. The use of the magnetic bearing system and permanent magnet motor allow for adequate operating clearances between rotating and nonrotating parts for fluid to pass, eliminating the need for seals, barrier fluid systems or protection bag/bellow systems. Particulate material in process fluid is free to flow through the clearances. For example, particulates can be approximately 1-4 mm in size. The use of these systems can also provide operational data for the well currently unavailable, or only available with additional sensor systems. For example, the sensor-less variable frequency drive can provide data on operating temperature and fluid properties through its operating requirements. Or, another example is an active thrust bearing can provide data on operating pressure during operation and liquid/gas content in the well. The device consists of high temperature components to allow survival in high temperature environments present in deep wells. The device can utilize fully isolated rotor and stator parts to protect any materials and components that would be adversely affected by the process fluids. This provides the isolation for allowing the process fluid to flow into and through the motor and bearings.

Magnetic bearing systems can offer advantages in certain applications over conventional mechanical bearings or air bearings. Magnetic bearings do not require lubrication and can operate in a variety of environments in which typical lubricated bearings have difficulty operating (such as vacuum conditions or in the presence of sour gas). The performance of active magnetic bearings is adjustable using a controller programmed in software (within the load ratings of the actuators of the magnetic bearings), whereas mechanical bearings require a mechanical change in hardware to provide a change in performance and/or response. A control loop (maintained, for example, by a controller) operates active magnetic bearings, as the actuators of active magnetic bearings are not passively stable.

Downhole devices typically operate in harsh environments constrained by the casing diameter installed in a drilled well. The process fluids present in the well are typically caustic on materials and can degrade equipment operation over the lifetime of the well. Lubrication for mechanical bearings can be quickly lost as the process fluids flow through the downhole devices, rendering the mechanical bearings unusable. Conventional approaches, for example, employed on electrical submersible pumps, include creating a chamber of clean oil for the mechanical bearings to operate on. The chamber is kept relatively clean by a labyrinth seal, but over time, process fluids can contaminate the oil, which can result in bearing failure.

In contrast, magnetic bearings can be isolated from the downhole environment or optionally operated within the downhole environment, exposed to the process liquids, if the components are compatible. Downhole-type devices can use active magnetic bearing systems that do not require lubrication and can operate flooded in the process fluid. For sealed systems (such as a motor for an electrical submersible pump), the downhole device does not need to be flooded in liquid to operate, which can significantly reduce drag losses on the motor and therefore increase pumping efficiency. Magnetic bearings also impose minimal losses. Therefore, the use of magnetic bearing systems in downhole devices can increase the relative torque output for an equivalently sized motor, or reduce size and power requirements for the same shaft torque output. Additionally, the motor is versatile in that the motor can be operated in a barrier fluid (as is done conventionally) or can be isolated from the fluid, meaning the motor can be operated flooded, flow through, or fully sealed with magnetic coupling operation.

The well system 100 includes a motor drive system 200 to provide power to a downhole-type tool (such as the downhole-type system 124). The motor drive system includes a VSD 203 (described in more detail later) and a downhole-type electric motor 312 (not shown in FIG. 1, but described in more detail later) to generate rotational force for the downhole-type system 124. The VSD 203 can be located at the surface 106 and is electrically connected (for example, by the wireline 128) to the motor 312, which can be positioned in the wellbore 104. The VSD 203 can control and supply power to the motor 312 when the motor 312 is positioned at a downhole location inside the wellbore 104. The motor 312 can operate at rotary speeds that are considered high speed in the industry, for example, rotary speeds over 3,600 rpm. The distance between the surface 106 and the downhole location (of the motor 312 positioned in the wellbore 104) can be at least 100 meters (m). In other words, the VSD 203 and the motor 312 positioned in the wellbore 104 can be physically located at least 100 m away from each other. In some cases, the distance between the surface 106 and the downhole location is at least 500 m. For example, the VSD 203 can be located topside (at the surface 106), and the motor 312 can be positioned downhole within the wellbore 104 over 500 m away from the VSD 203. In general, a distance between the VSD 203 and the motor 312 is such that, without the features described in this disclosure, drive signals transmitted from the VSD 203 to the motor 312 over the long distances can suffer losses that lower efficiency and negatively impact motor speed and torque control. Therefore, in some cases with the features described in this disclosure, the VSD 203 can control and supply power to the motor 312 when the motor 312 is spaced apart from the VSD 203 by a distance of at least 100 m. In some cases, the VSD 203 can generate and transmit a drive signal to the motor 312 in order to supply power to the motor 312. The motor drive system 200 can include a step-up transformer 205 (described in more detail later) electrically coupled to the motor 312 and the VSD 203. The transformer 205 can prevent common mode current and capacitive leakage current through the transmitted drive signal over the distance from the VSD 203 to the electric motor 312. The transformer 205 can also step up the drive voltage over the distance, allowing the use of a low voltage VSD 203. The distance between the VSD 203 and the transformer 205 can be less than the distance between the transformer 205 and the motor 312. In other words, the transformer 205 is physically located closer to the VSD 203 than the motor 312 (which can be located downhole). For example, the transformer 205 can be positioned at the surface 106 like the VSD 203, while the motor 312 is positioned within the wellbore 104. The motor drive system 200 can include a power source 201, such as an electric current source like a grid.

Figure 2:
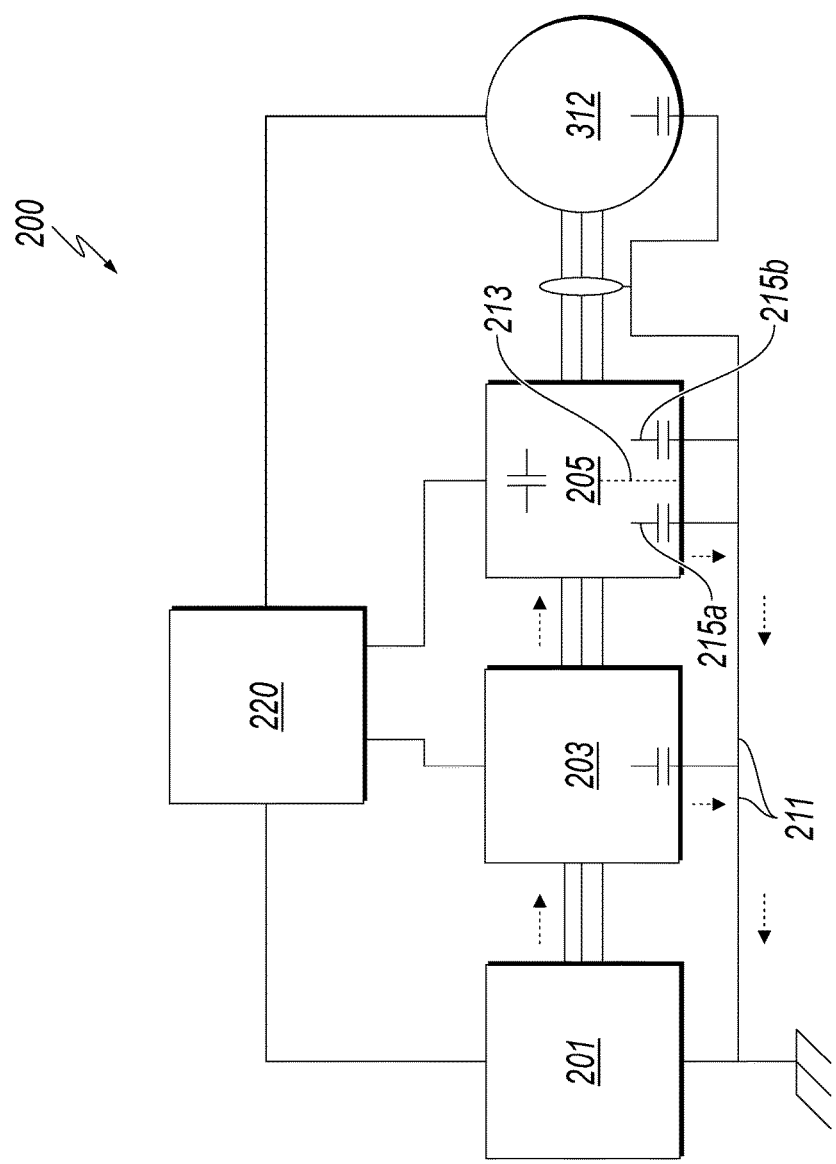
FIG. 2 is a schematic view of an example motor drive system.

FIG. 2 illustrates a schematic view of an example of the motor drive system 200. The motor drive system 200 includes the power source 201, the VSD 203, the step-up transformer 205, and the electric motor 312. The components (201, 203, 205, 312) of the system 200 are all electrically coupled to one another. The power source 201 can include an alternating current source, and the power source 201 can include a rectifier to convert the alternating current into direct current to provide a direct current source 201 to the motor drive system 200. The motor drive system 200 can include a controller 220 electrically coupled to the direct current source 201, the VSD 203, the transformer 205, and the motor 312. The motor drive system 200 shown in FIG. 2 employs a three-phase drive, and the VSD 203 together with the transformer 205 can be used to control the rotary speed of the motor 312 over long cable distances (for example, over distances longer than 100 m).

The VSD 203 is a VSD of low voltage (less than 600 volts). The VSD 203 can generate and transmit a drive signal to supply power to the motor 312. The drive signal can be sufficient to power the motor 312 to operate at the rotary speeds, for example, at speeds of at least 6,000 rpm. The drive signal can include a pulse width modulated sinusoidal waveform, and the VSD 203 can switch frequencies at a rate that is sufficient to generate the drive signal to power to motor 312 to operate at the rotary speeds. For example, the VSD 203 can produce a high frequency drive signal of 1,000 hertz (Hz) for a 60,000 rpm two pole motor or (as another example) 2,000 Hz for a 60,000 rpm four-pole motor. With pulse width modulation, the average value of voltage (and current) to a load is controlled by turning a switch between supply and load, on and off at a fast rate. The longer the switch is on compared to the off periods, the higher the total power supplied to the load. The power loss in the switching device (the VSD 203) implementing the pulse width modulation can be very low. When the switch is off, there is practically no current, and when the switch is on (and power is being transferred to the load), there is almost no voltage drop across the switch. Power loss (which is the product of voltage drop and current), is therefore (in both cases) very low. To produce the high frequency sinusoidal waveform, insulated gate bipolar transistors can switch at frequencies five to ten times faster than the waveform being produced in order to generate a clean waveform with a total harmonic distortion of less than substantially 15% and reduce switching harmonics (which cause losses in the system). The VSD 203 can be sensorless. In other words, the VSD 203 can drive the motor 312 across long distances (for example, longer than 100 m) and can operate without sensors, meaning rotor speed sensor signal transmissions and position sensor signal transmissions are not required.

The step-up transformer 205 steps up the output from the VSD 203. The transformer 205 can include a gapped core, which can be used to allow a short-term direct current to pass from the VSD 203 to the motor 312 for startup of the motor 312. The controller 220 can perform operations including controlling the direct current source 201 to pass the direct current through the gapped core to the motor 312. The gapped core can facilitate direct current transfer from the VSD 203 to the motor 312. The transformer 205 can include core material, which can transfer the pulse width modulated signal to the motor 312 with minimal core loss. The transformer 205 can include a primary winding 215a, a secondary winding 215b, and a capacitive shield 213 between the primary winding 215a and the secondary winding 215b. The shield 213 can be used to prevent the capacitive leakage in the drive signal transmitted over the distance from the VSD 203 to the motor 312. Using the transformer 205 can reduce or eliminate capacitive ground current 211 by cable parasitic capacitance. Without the transformer 205, there can be a large ground current from the power source 201 (such as a utility grid) to the cable ground due to large capacitance of the long cable between the VSD 203 and the motor 312. Large ground currents are undesirable during operation because the ground current can interfere with controlling the VSD 203. Without the transformer 203, large ground current can also flow through the power source 201 (utility grid), which is also an undesirable result. For example, without the transformer 203, current can travel from the power source 201 to the VSD 203, from the VSD 203 to the motor 312, along with leakage to the ground current.

The electric motor 312 can include a permanent magnet. In some cases, the electric motor 312 is a permanent magnet synchronous motor. A synchronous motor is similar to an alternator with a rotating field. The electric motor 312 can include an electric rotor and an electric stator surrounding the electric rotor. In some cases, when the electric motor 312 is pre-spinning prior to the start of the VSD 203, the controller 220 can perform operations including aligning a voltage of the electric stator of the motor 312 to synchronize with a rotary speed of the electric rotor of the motor 312. During startup of the motor 312, the rotor of the motor 312 in a known position must be aligned with respect to the stator of the motor 312. The alignment can be facilitated by passing a direct current to a d-axis armature winding. The d-axis is the axis of the field winding in the direction of the direct current field and is also referred as the rotor direct axis. The stator voltage must be aligned in sync to the rotary speed of the rotor in order to facilitate smooth, synchronous operation of the motor 312. This alignment can be performed without the use of sensors. For example, the alignment can be performed based on the known motor current. Some examples of tuning parameters that can be adjusted to optimize catch-spin performance of the alignment include primary to secondary leakage inductance of the step up transformer 203, primary to secondary step up ratio, cable inductance, and cable resistance.

In instance where the motor 312 is used in a downhole environment, the construction of the components of the motor 312 are configured to withstand the impacts, scraping, and other physical challenges the electric machine can encounter while being passed hundreds of feet/meters or even multiple miles/kilometers into and out of a wellbore. For example, the motor 312 can be disposed in a wellbore at a depth of up to 15,000 feet (4,572 meters). Beyond just a rugged exterior, this encompasses having certain portions of any electronics being ruggedized to be shock resistant and remain fluid tight during such physical challenges and during operation. Additionally, the electric machine is configured to withstand and operate for extended periods of time (e.g., multiple weeks, months, or years) at the pressures and temperatures experienced in a wellbore, which temperatures can exceed 400° F./205° C. and pressures over 2,000 pounds per square inch, and while submerged in the well fluids (gas, water, or oil, as examples). The motor 312 can be configured to interface with one or more of the common deployment systems, such as jointed tubing (i.e., lengths of tubing joined end-to-end, threadingly and/or otherwise), a sucker rod, coiled tubing (i.e., not-jointed tubing, but rather a continuous, unbroken, and flexible tubing formed as a single piece of material), or wireline with an electrical conductor (i.e., a monofilament or multifilament wire rope with one or more electrical conductors, sometimes called e-line) and thus have a corresponding connector (e.g., positioning connector, which can be a jointed tubing connector, coiled tubing connector, or wireline connector).

To protect the electrical components in the electric machine, the electronics can be "canned" or otherwise isolated from the wetting fluid. That is, a shield can be positioned at least along an inner circumference of the stators 310. The stator 310c can include sealing elements to isolate the stator 310c from an outside environment. The stator sealing elements act as a shield to protect and isolate windings. The stator sealing elements are welded or otherwise attached to the stators 310c to prevent process fluids from contacting the windings and affecting performance. The sealing elements can be metallic and non-magnetic, but can also be made of a non-metallic material, such as polyether ether ketone (PEEK) or ceramic. The electric motor 312 is also shown in FIG. 3B and is described in more detail later.

Figure 3A:
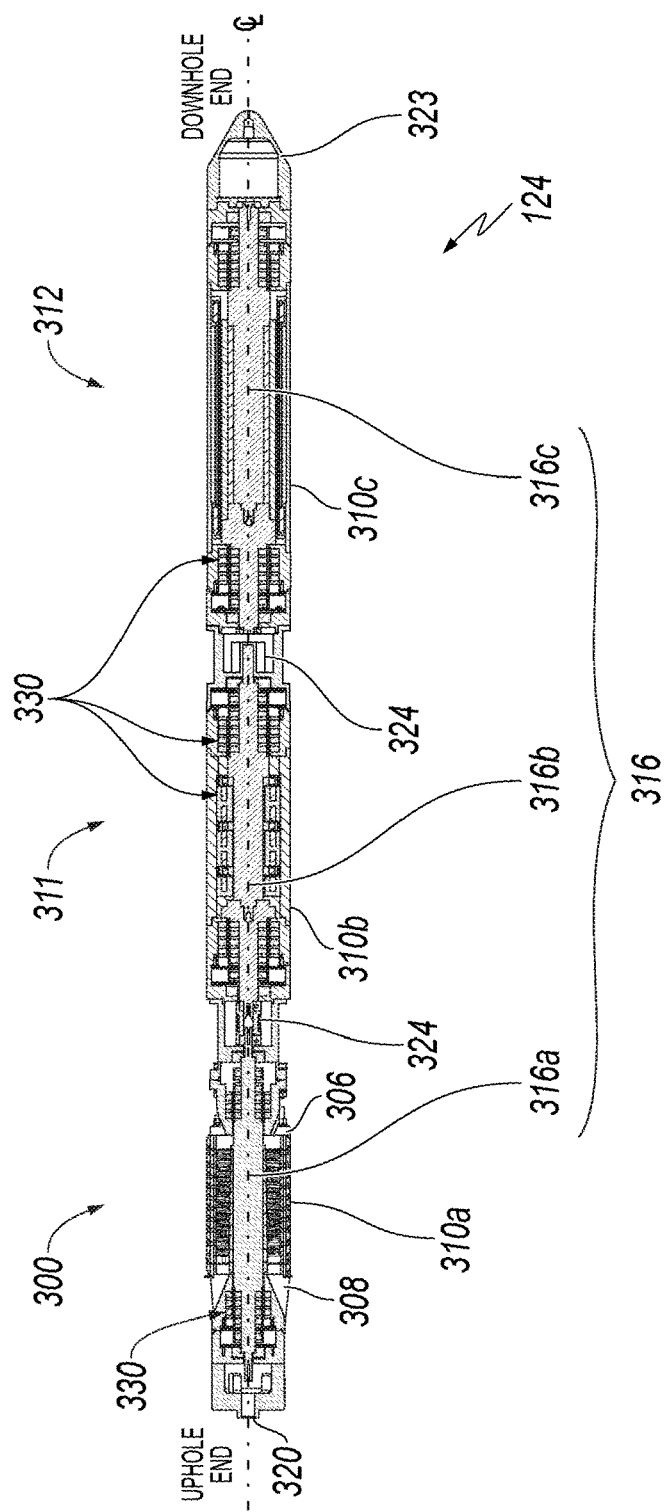
FIG. 3A is a schematic side half cross-sectional view of an example downhole-type system.
Figure 3B:
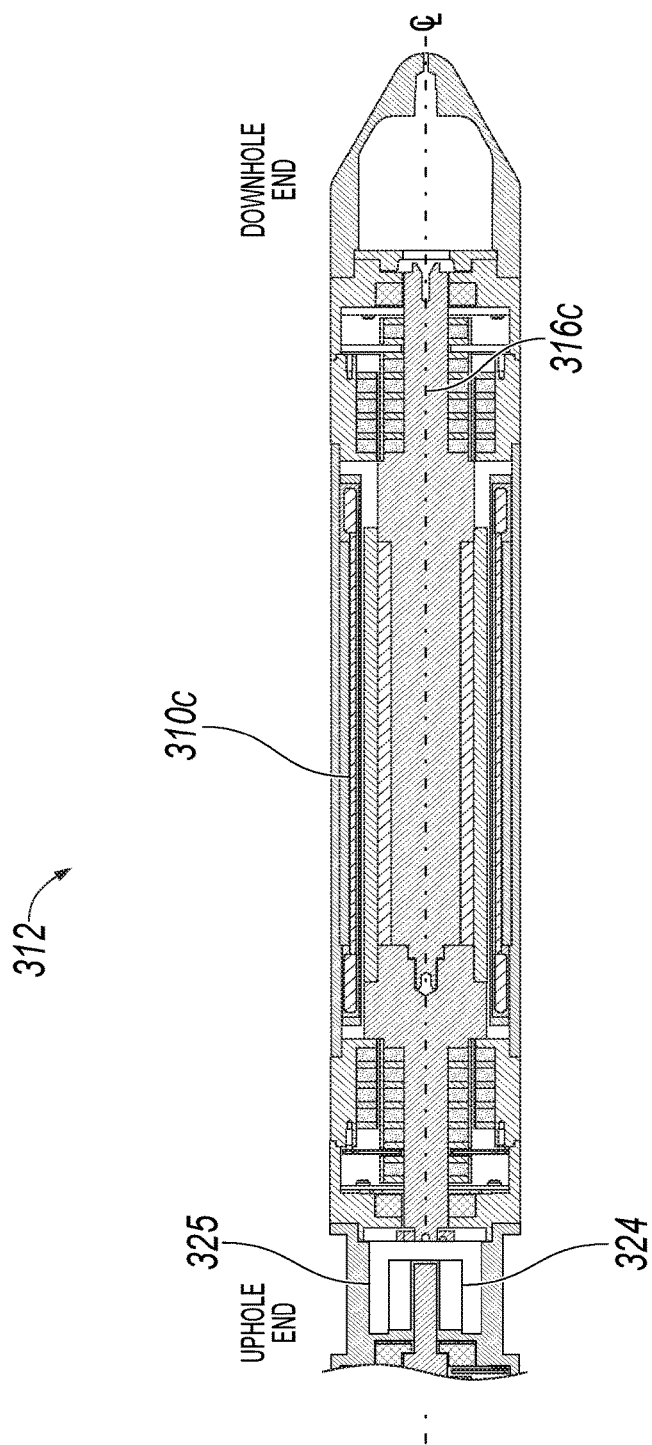
FIG. 3B is a schematic side half cross-sectional view of an example motor of the downhole-type system in FIG. 3A.

FIG. 3A shows a half side cross-sectional view of the example downhole-type system 124. Referring to both FIGS. 1 and 3A, the example downhole-type system 124 includes a blower 300, a thrust bearing module 311, and the motor 312 (the motor 312 is part of the motor drive system 200 and also a part of the downhole-type system 124). As mentioned previously, the downhole-type system 124 can include in addition to or instead of the blower 300, another type of rotating equipment, such as a pump (e.g. an electrical submersible pump). In the context of this disclosure, an uphole end or direction is an end nearer or moving in a direction towards the surface 106. A downhole end or direction is an end nearer of moving in a direction away from the surface 106. A coupling 320 is positioned at an uphole end of the blower 300. The coupling can be of a type used for a wireline connection, a tubing connection, or any other connection configured to support the weight of the downhole-type system. The coupling 320 can include a standard attachment method to attach the blower 300 to a support system. For example, a threaded interface can be used for sucker rod, or a set of bolts can be used to attach two flanges together for production tubing. The blower 300 includes an inlet 306 to receive a gas at the first pressure downhole of the blower 300 and an outlet 308 to output the gas at the second, higher pressure uphole of the blower 300. The inlet 306 can include a filter to limit particle sizes above a certain threshold from entering the downhole-type system 124. A cylindrical outer housing 310a houses an impeller in fluid communication with the inlet 306 to receive the gas from the wellbore 104 at the first pressure downhole of the blower 300 and to drive the gas to the outlet 308 at the second, higher pressure uphole of the blower 300. The inlet 306 includes a series of holes evenly spaced around the circumference of the housing 310a and oriented in a downhole trajectory. The outlet 308 includes a series of holes evenly spaced around the circumference of the housing 310a and oriented in a uphole trajectory. With the system 124 residing in the wellbore 104, the inlet 306 is at a downhole end of the blower 300 and the outlet 308 is at an uphole end of the blower 300. At a downhole end of the system 124 is a conical tip 323. The conical tip 323 reduces the pressure drop across the system 124. In some implementations, the conical tip 323 can house electronics that can be used in aspects of operation of the system 124 or for sensors. In some instances, the system 124 can be positioned in the well with the downhole inlet 306 positioned adjacent to the perforations 114 in the wellbore 104. For example, the blower 300 can be positioned in the wellbore 104 such that the inlet 306 is disposed next to and immediately uphole of the perforations 114 to maximize or improve the fluid flow from the perforations into the blower 300. In some examples, the inlet 306 may not be adjacent to perforations 114, such as the inlet 306 being positioned greater than about twenty feet away from the perforations 114. In some instances, a speed of the blower 300 is adjusted based on the fluid flow from the subterranean zone into the wellbore 104 (e.g., via perforations 114). For example, as the fluid flow from the subterranean zone into the wellbore 104 decreases, a speed of the blower 300 can increase to draw more fluid flow from the subterranean zone into the wellbore 104.

As previously described, the downhole-type system 124 moves the fluid from the downhole inlet 306 at the first pressure to the uphole outlet 308 at the second, higher pressure. This pressure differential promotes the fluid flow to move uphole of the system 124, for example, at a higher flow rate compared to a flow rate in a wellbore without a blower. The blower 300 can operate at a variety of speeds, for example, where operating at higher speeds increases fluid flow, and operating a lower speeds reduces fluid flow. In some instances, the impeller of the blower 300 can operate at speeds up to 120,000 rpm. In some instances, the impeller of the blower 300 can be run at lower speeds (e.g., 40,000 rpm, or other). For the downhole-type system 124 illustrated in FIGS. 1 and 3A, the maximum operating speed is 60,000 rpm. Specific operating speeds for the downhole system are defined based on the fluid, pressures and flows for the well parameters and desired performance. Speeds may be as slow as 10,000 rpm or as fast as 120,000 rpm. While the downhole system has an optimal speed range at which it is most efficient, this does not prevent the downhole system from running at less efficient speeds to achieve a desired flow for a particular well, as well characteristics change over time.

The motor 312, the thrust bearing module 311, and the blower 300 are all coupled together on a central shaft 316. The central shaft 316 can be levitated and axially supported by magnetic thrust bearing assemblies located in the thrust bearing module 311 as the central shaft 316 rotates. Radial bearing assemblies can radially levitate and support the central shaft 316. While one of each motor 312, thrust bearing module 311, and blower 300 modules are shown, more than one of each or all are practical in this configuration, thus allowing for additional motor power, additional thrust load support, and additional flow or pressure capacity to be added independently of each other to best produce the specific well performance. In addition, while the order of motor 312, thrust bearing module 311, and blower 300 module from downhole to uphole is shown, each module functions independently and can be placed in other orders that best suit the operation and integration of each module. Additionally, while a blower 300 is shown, this can be replaced with a compressor, a liquid pump, a multiphase pump, or a combination thereof that best suits the fluids and conditions of the well to maximize well performance. In addition, the use of magnetic thrust bearing assemblies can be seen as one example of such an implementation of magnetic bearings, where magnetic radial bearings can be used instead of or in addition to, in any case to enhance the downhole system performance. Magnetic bearings can be used to maintain levitation along at least one axis. In other words, the magnetic bearings can be used to maintain axial levitation of the rotatable central shaft 316, radial levitation of the rotatable central shaft 316, or both.

In some implementations, an active damping circuit can be included. The active damping circuit uses a coil to sense rotor radial motion and provide a current in size and frequency relative to this motion to a control board. The control board amplifies this signal and adjusts the relative polarity/phase to feed it back to a damping coil that reacts against the rotor field to resist the motion, thus damping out the motion. No radial position sensors or controller is required for operation. The active damping circuit is able to adjust the magnetic field sufficiently enough to reduce vibration, but does not have the power to significantly affect the lifting or support characteristics of the bearing. In some implementations, the active damping circuit acts as a generator that generates power when the axial gap decreases and thus powers a control coil to increase the levitating force. Thus, it doesn't need a sensor or an outside power source/controller. This approach can also be used for the axial axis, where a sense coil output sensing axial motion is amplified and fed to a damping to coil to react against the rotor field to resist motion.

The magnetic thrust bearing assembly and the magnetic radial bearing assembly can fully support the central shaft 316 with one or more electromagnetic fields. That is, the central shaft 316 is not physically coupled the outer housing 310 during normal operation; there is no physical connection between the central shaft 316 and the outer housing 310. In other words, the shaft is spaced apart from the housing 310 and any associated mechanism connected to the housing 310 with a radial gap between the central shaft 316 and the housing 310.

In the illustrated implementation, the motor 312 is positioned downhole of the blower 300. The illustrated implementation also shows the thrust bearing module 311 resides between the motor 312 and the blower 300. In some instances, the blower 300, the thrust bearing module 311, and the motor 312 can be assembled in a different order. For example, the thrust bearing module 311 can be positioned downhole of the motor 312 or uphole of the blower 300.

In FIG. 3A, the central shaft 316 comprises multiple sub-sections coupled together: a blower rotor 316a, a thrust bearing rotor 316b, and an electric rotor 216c (which is the rotor of the motor 312). Each sub-section is joined together by a coupling 324. The coupling 324 can be a bellows, quill, diaphragm, or other coupling type that provides axial stiffness and radial compliance. In certain instances, the coupling 324 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. In some implementations, the central shaft 316 can include a single, unitary shaft that runs through the blower 300, the thrust bearing module 311, and the motor 312. In the same way, the blower 300, the thrust bearing module 311, and the motor 312 can each have their own outer casings (310a, 310b, 310c, respectively) or a combined outer casing 310.

The use of magnetic bearings allows for a seal-less design. That is, the surface of the blower rotor 316a, the thrust bearing rotor 316b, and the electric rotor 316c need not be sealed from and can all be exposed to the production fluid. As no mechanical bearings are used in the downhole-type system, no lubrication is needed. As there is no lubrication or mechanical parts that have contamination concerns, no seals are needed for such components. Sensitive electronic and magnetic components can be "canned" or otherwise isolated from the downhole environment without affecting their electromagnetic characteristics. There is a fluid path through the active magnetic bearing assemblies that allow fluid to flow through an "air-gap" in each of the bearings. More specifically, the active magnetic thrust bearing assemblies have gaps between a bearing housing 330 and the central shaft 316. The gap is unsealed and is of sufficient size to allow fluid flow through the magnetic thrust bearing assembly. The gaps can be annular fluid gaps that are not simply exposed to the process fluid flowing through the downhole-type system 124, but the process fluid is actively flowed through the gaps. The magnetic radial bearing assemblies include one or more gaps between a bearing housing 330 and the central shaft 316, and such process fluid flow (that is, through the gaps) allows for cooling of, for example, the rotor 316 and the bearing assemblies.

The radial bearing gaps and the thrust bearing gaps are sufficiently large to allow particulates to pass through without causing damage to rotating or stationary components. For example, in the illustrated implementation, an air-gap between the central shaft 316 (e.g., permanent magnet rotor 316c) and a stator of the motor 312 receives the fluid during operation of the downhole-type system 124. That is, an air-gap between the permanent magnet rotor 316c and the electric stator of the motor receives the fluid during operation of the motor. The bearings do not require seals as there is no physical contact between the rotor 316 and the outer case 310b. In other words, the central shaft 316 is spaced apart from the outer housing 310 and is not mechanically connected to the outer housing 310.

FIG. 3B further illustrates the motor 312 of the downhole-type system 124 (the motor 312 is also part of the motor drive system 200). In the illustrated implementations, the motor 312 is coupled to a downhole end of the thrust bearing module 312 (not shown). The motor 312 can be configured to drive another piece of equipment, such as the blower rotor 316a (not shown). The motor 312 includes an electric rotor 316c that can be levitated and supported by one or more magnetic bearings (or instead of or in addition to the thrust bearing module 311). The rotor 316c includes a permanent magnet. The rotor 316c can be coupled to the thrust bearing rotor 316b by a magnetic coupling 324 attached to an end of the rotor 316c. The coupling 324 can be a bellows, quill, diaphragm, or other coupling type that provides axial stiffness and radial compliance. The coupling 324 can transmit rotational force to a separate rotational device (such as the thrust bearing module 311, the blower 300, or another piece of rotating equipment). In certain instances, the coupling 324 can allow for angular misalignment of 0.30-2.0 degrees, and a lateral misalignment of 0.01 inches. Variation in thermal growth can be designed to be accepted in the compressor and motor clearances, though the coupling 334 can tolerate about 0.03 inches of axial misalignment. The motor 312 includes a containment sleeve 325 surrounding the rotor 316c and the coupling 324. The containment sleeve 325 can maintain the rotor 316c and the coupling 324 in compression during rotation of the rotor 316c at the rotary speeds. The containment sleeve 325 can also maintain the permanent magnets on the rotor 316c in compression during rotation of the rotor 316c at the rotary speeds. The containment sleeve 325 can support a centrifugal loading of the coupling 324 and can be made of a high tensile strength material including metal, carbon-fiber, or combinations of both. In some cases, the containment sleeve 325 is made of metal, and the metallic containment sleeve 325 can form a portion of a stiffness path of the rotor 316c.

An electric stator 310c surrounds the rotor 316c. One or more magnetic radial bearings can support and levitate the rotor 316c to the electric stator 310c. In some cases, the thrust bearing module 311 axially supports the rotor 316c while the rotor 316c rotates, so no thrust bearing is needed within the motor 312. In some cases (although not shown), a downhole-type system does not include separate thrust bearing module 311 that includes all of the magnetic thrust bearings, but one or more magnetic thrust bearings are included in the system 124 and distributed across the various modules of the system (such as within the blower 300 or the motor 312). The stator 310c is canned using a metallic or non-metallic sleeve on the inner diameter of the stator 310c. The stator 310c can be constructed with laminations having a thickness sufficient to decrease eddy current losses due to a frequency of a drive signal generated and transmitted by a VSD (such as the VSD 203) to supply power to the motor 312 to operate at the rotary speeds. In some implementations, the distance between the outer diameter of the containment sleeve 325 and the inner diameter of the stator 310c is substantially 0.025 inches or larger. In this specification, "substantially" means a deviation or allowance of up to 10 percent (%) and any variation from a mentioned value is within the tolerance limits of any machinery used to manufacture the part. The can is sealed, by welding for example, at each end and supported from any well pressure by the stator and/or potting behind the sleeve to insure it does not deform during operation. In some implementations, the rotor 316c can include a protective rotor casing that shields vital rotor components from an outside environment (such as the uphole zone 130 or the downhole zone 132). Multiple motors (or similar electric machines) 312 can be connected in series to produce more power if needed.

The motor 312 is controlled by a high frequency variable speed drive (VSD) from the surface. Variable frequency or speed allows the motor 312 to drive the rotating device at a speed optimal for well production. It also allows for the same drive to be used at many well sites where performance in speed and power vary. While sensored drives could be used, bringing sensor signals to the surface over long distances presents many challenges, including cables and connectors in addition to having the actual sensor and their associated electronics installed in the system. The downhole-type system 124 uses a sensor-less VSD (such as the VSD 203) capable of long distance (in some cases, longer than 500 m) motor 312 control. This sensor-less VSD 203 monitors the speed of the motor 312 and is able to maintain speed or torque control of the motor 312 to ensure it operates as desired. The VSD 203 is also capable of interpreting the machine parameters to provide operating data on motor temperature and fluid properties, such as density, for example.

Cables connect the topside VSD 203 to the downhole motor 312, transmitting the low voltage (<600 VAC) or medium voltage (<10,000 VAC) from the VSD 203 to the motor 312. For longer distances higher voltage is desired to reduce current losses in the cable and reduce cable size. Reductions in cable size reduce cable cost and cable weight, though require higher class of electrical insulation on the cable.

Figure 4:
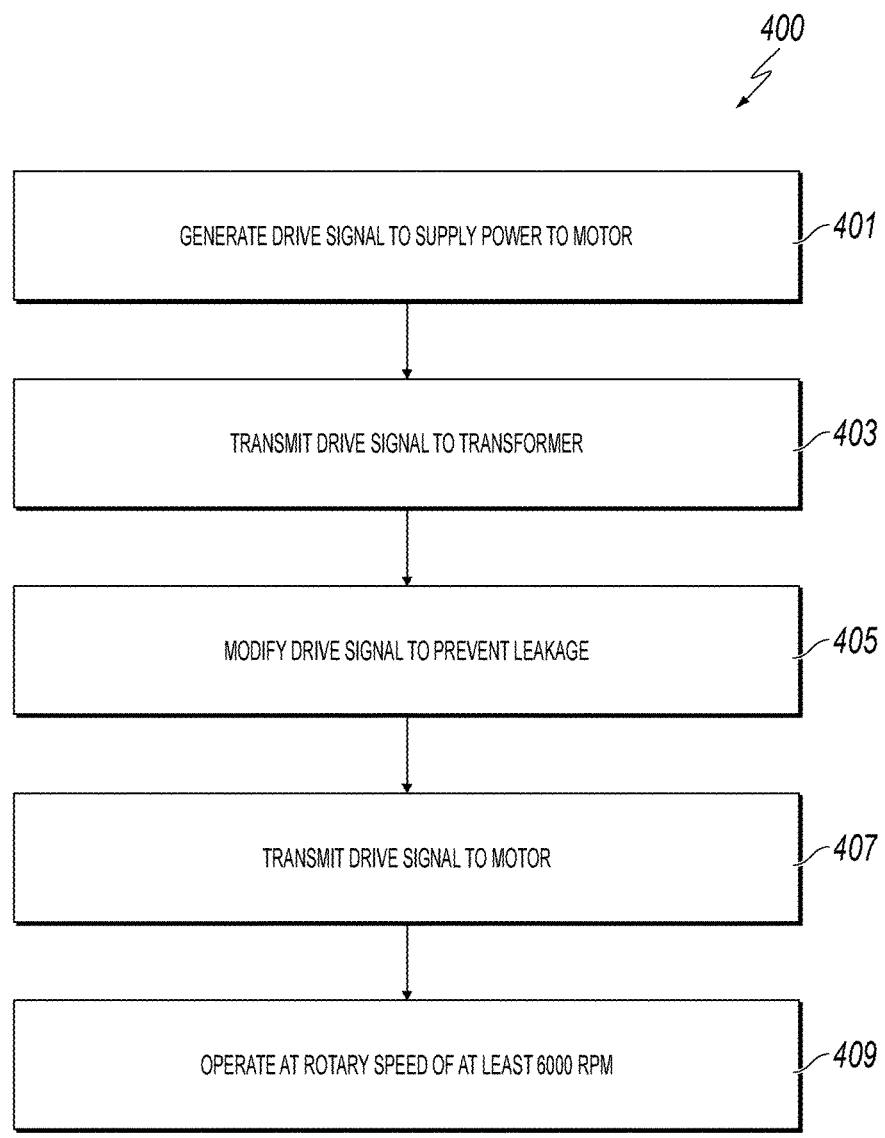
FIG. 4 is a flow chart of an example method for providing power to a tool.

The components described previously within this disclosure can be used to implement the example method 400 shown in FIG. 4. The method 400 can be implemented to provide power to a tool, such as the downhole-type system 124. At 401, a drive signal is generated by a VSD (such as the VSD 203) to supply power to an electric motor (such as the motor 312) that is physically positioned apart from the VSD by a distance of at least 100 m. For example, the VSD 203 can be located at the surface 106, and the motor 312 can be located within the wellbore 104. The electric motor is configured to operate at rotary speeds of at least 6,000 rpm.

At 403, the drive signal is transmitted by the VSD 203 to a step-up transformer (such as the transformer 205) electrically coupled in series to the VSD 203 and the motor 312. The drive signal can be a pulse width modulated drive signal, and generating and transmitting the pulse width modulated drive signal with the VSD 203 can include switching frequencies at a rate that is sufficient to generate the drive signal to power the motor 312 to operate at the rotary speeds. The switching frequency can be 5 to 20 times faster than the fundamental driving frequencies (or even faster). For example, the switching frequency can be in a range of 1000 Hz to 25,000 Hz.

At 405, the drive signal received from the VSD 203 is modified by the transformer 205 to prevent capacitive leakage in the drive signal. The transformer 205 can include a gapped core to allow short-term direct current transfer from the VSD 203 to the motor 312. The transformer 205 can include a shield (such as the shield 213) to prevent capacitive leakage in the drive signal transmitted over the distance between the VSD 203 and the motor 312.

At 407, the drive signal (modified by the transformer 205) is transmitted over the distance of at least 100 m to the motor 312. The VSD 203 can drive the motor 312 across long distances without employing sensors.

At 409, the electric motor 312 is operated at the rotary speeds (of at least 6,000 rpm) in response to receiving the drive signal modified by the transformer 205. During startup of the motor 312, a direct current can be transmitted to pass through a gapped core of the transformer 205 to the motor 312. When the motor 312 is pre-spinning prior to the start of the VSD 203, a voltage of an electric stator of the motor 312

(such as the stator 310c) is aligned to synchronize with a rotary speed of an electric rotor of the motor 312 (such as the rotor 316c).

While some examples of the subject matter have been disclosed, aspects of this disclosure can describe other implementations. For example, in some implementations, the central shaft rotates at a sub-critical speed below a first harmonic of the central shaft. In some implementations, the central shaft can include a single, continuous shaft. While the illustrated examples included two radial bearings within each module, a single radial bearing at an uphole end of the downhole-type system and at a downhole end of the downhole-type system (two total radial bearings) can provide adequate levitation and support. Active and/or passive damping systems can be used on the active magnetic bearings. In instances where a passive damping system is used, a highly electrically conductive metal plate, such as a copper plate, can be used. In such an instance, the movement of the rotor generates eddy currents on a copper plate. The eddy currents in turn generate a magnetic field that opposed the field in the rotor, resulting in a force applied to the rotor opposite that of the motion, reducing the motion. The faster and larger the motion, the larger the force generated on the plate in response to the motion. While a permanent magnet rotor was described in the context of the motor, an inductive rotor, can be used to similar effect at low speeds (for example, less than 6,000 rpm).

The techniques described here can be implemented to yield a construction that is simple, inexpensive, and physically robust. The system can be deployed without special hydraulic or electrical requirements and can be easily retrievable with minimum or no risk of being stuck in the wellbore. The concepts described herein with respect to a blower could also be applied to a compressor, having a higher pressure ratio and lower throughput, a pump, or a multiphase system where the fluid is a combination of liquid and gas. While this disclosure has been described in the context of production applications, it can also be used in injection applications. For example, the described systems can be used to inject fluid into a reservoir to maintain a production pressure on the reservoir.

A number of implementations have been described. Nevertheless, it will be understood that various modifications may be made. Accordingly, other implementations are within the scope of the following claims.

What is claimed is:

1. A system to provide power to a downhole-type tool, the system comprising:
    a downhole-type electric motor configured to be positioned in a wellbore, the downhole-type electric motor configured to operate at rotary speeds of at least 6,000 rotations per minute (rpm);
    a low voltage variable speed drive electrically connected to the electric motor, the variable speed drive configured to, when the variable speed drive is positioned at a surface of the wellbore and the electric motor is positioned in a downhole location in the wellbore, operate at a voltage of less than 600 volts to control and supply power to the electric motor to operate at rotary speeds of at least 6,000 rpm; and
    a step-up transformer electrically connected to the electric motor and the low voltage variable speed drive, wherein the step-up transformer comprises a gapped core and a capacitive shield, and wherein the step-up transformer and the low voltage variable speed drive are cooperatively configured to power the electric motor to operate at the rotary speeds of at least 6,000 rotations per minute across the distance between the surface and the downhole location in the wellbore.

2. The system of claim 1, wherein a distance between the surface and the downhole location is at least 100 meters.

3. The system of claim 2, wherein the distance between the surface and the downhole location is at least 500 meters.

4. The system of claim 1, wherein the variable speed drive is sensorless.

5. The system of claim 1, wherein the variable speed drive is configured to transmit a drive signal comprising a pulse width modulated sinusoidal waveform, wherein the variable speed drive is configured to switch frequencies at a rate that is sufficient to generate the drive signal to power the electric motor to operate at the rotary speeds.

6. The system of claim 1, wherein the electric motor comprises:
    an electric rotor;
    an electric stator surrounding the electric rotor;
    a magnetic coupling attached to an end of the electric rotor, the magnetic coupling configured to transmit rotational force to a separate rotational device; and
    a containment sleeve surrounding the electric rotor and the magnetic coupling, the containment sleeve configured to maintain the electric rotor and the magnetic coupling in compression during rotation of the electric rotor at the rotary speeds.

7. The system of claim 6, wherein the containment sleeve is configured to support a centrifugal loading of the magnetic coupling.

8. The system of claim 6, wherein the electric rotor comprises a permanent magnet, and the containment sleeve is configured to maintain the permanent magnet in compression during rotation of the electric rotor at the rotary speeds.

9. The system of claim 6, wherein the containment sleeve is made of a high tensile strength material comprising at least one of metal or carbon-fiber.

10. The system of claim 6, wherein the containment sleeve is made of metal, wherein the metallic containment sleeve is configured to form a portion of a stiffness path of the electric rotor.

11. The system of claim 6, wherein the electric stator is constructed with laminations having a thickness sufficient to decrease eddy current losses due to a frequency of a drive signal generated and transmitted by the variable speed drive to supply power to the electric motor to operate at the rotary speeds.

12. The system of claim 6, wherein a distance between an outer diameter of the containment sleeve and an inner diameter of the electric stator is substantially 0.025 inches or larger.

13. The system of claim 1, wherein the motor is a permanent magnet synchronous motor.

14. A system to provide power to a tool, the system comprising:
    an electric motor configured to operate at rotary speeds of at least 6,000 rotations per minute (rpm);
    a low voltage variable speed drive electrically connected to the electric motor, the variable speed drive configured to operate at a voltage of less than 600 volts to control and supply power to the electric motor to operate at rotary speeds of at least 6,000 rpm when the electric motor is spaced apart from the variable speed drive by a distance of at least 100 meters; and
    a step-up transformer electrically connected to the electric motor and the low voltage variable speed drive, wherein the step-up transformer comprises a gapped core and a capacitive shield, and wherein the step-up transformer and the low voltage variable speed drive are cooperatively configured to power the electric motor to operate at the rotary speeds of at least 6,000 rotations per minute across the distance between the electric motor and the low voltage variable speed drive.

15. The system of claim 14, wherein the variable speed drive is configured to transmit a drive signal comprising a pulse width modulated sinusoidal waveform, wherein the variable speed drive is configured to switch frequencies at a rate that is sufficient to generate the drive signal to power the electric motor to operate at the rotary speeds.

16. The system of claim 14, wherein the electric motor comprises:

an electric rotor;

an electric stator surrounding the electric rotor;

a magnetic coupling attached to an end of the electric rotor, the magnetic coupling configured to transmit rotational force to a separate rotational device; and a containment sleeve surrounding the electric rotor and the magnetic coupling, the containment sleeve configured to maintain the electric rotor and the magnetic coupling in compression during rotation of the electric rotor at the rotary speeds.

17. The system of claim 16, wherein the containment sleeve is configured to support a centrifugal loading of the magnetic coupling.

18. The system of claim 16, wherein the containment sleeve is made of a high tensile strength material comprising at least one of metal or carbon-fiber.

19. The system of claim 16, wherein the containment sleeve is made of metal, wherein the metallic containment sleeve is configured to form a portion of a stiffness path of the electric rotor.

20. The system of claim 16, wherein the electric stator is constructed with laminations having a thickness sufficient to decrease eddy current losses due to a frequency of a drive signal generated and transmitted by the variable speed drive to supply power to the electric motor to operate at the rotary speeds.

21. The system of claim 14, wherein the electric motor is a permanent magnet synchronous motor.

* * * * *